(12) United States Patent
Matsukawa

(10) Patent No.: US 10,419,391 B2
(45) Date of Patent: Sep. 17, 2019

(54) IP COMMUNICATION SYSTEM, IP ADDRESS SETTING UNIT, AND IP ADDRESS SETTING METHOD

(71) Applicant: Hitachi Kokusai Electric Inc., Tokyo (JP)

(72) Inventor: Tomoki Matsukawa, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 27 days.

(21) Appl. No.: 15/513,253

(22) PCT Filed: Sep. 30, 2014

(86) PCT No.: PCT/JP2014/076085
§ 371 (c)(1),
(2) Date: Mar. 22, 2017

(87) PCT Pub. No.: WO2016/051504
PCT Pub. Date: Apr. 7, 2016

(65) Prior Publication Data
US 2017/0222972 A1 Aug. 3, 2017

(51) Int. Cl.
*H04L 29/12* (2006.01)
*H04L 12/751* (2013.01)
*H04L 29/08* (2006.01)

(52) U.S. Cl.
CPC .......... *H04L 61/2046* (2013.01); *H04L 45/02* (2013.01); *H04L 61/2007* (2013.01); *H04L 61/2038* (2013.01); *H04L 67/12* (2013.01)

(58) Field of Classification Search
CPC ...................................... H04L 45/02
USPC ...................................... 370/392
See application file for complete search history.

(56) References Cited

U.S. PATENT DOCUMENTS

2005/0273823 A1* 12/2005 Brady, Jr. ........... H04L 61/2038 725/76
2010/0274945 A1* 10/2010 Westrick, Jr. ..... H04L 29/12254 710/316

FOREIGN PATENT DOCUMENTS

| JP | 2012-129908 A | 7/2012 |
| JP | 2012-175482 A | 9/2012 |
| WO | 2012/127634 A1 | 9/2012 |

OTHER PUBLICATIONS

International Search Report of PCT/JP2014/076085 dated Oct. 28, 2014.

* cited by examiner

Primary Examiner — Peter G Solinsky
(74) Attorney, Agent, or Firm — Mattingly & Malur, PC

(57) ABSTRACT

An IP communication system has a switching hub having at least first to (n+1)-th ports (where n is an integer equal to or greater than two); first to n-th IP devices connected to the respective first to n-th ports; and an IP address setting unit connected to the (n+1)-th port. The IP address setting unit transmits, to the switching hub, a first port open instruction to open the first port and to close the second to n-th ports, and thereafter transmits, to the switching hub, a first IP address to be set to the first IP device. Upon reception of the first port open instruction from the IP address setting unit, the switching hub opens the first port and closes the second to n-th ports. Upon reception of the first IP address, the switching hub transmits the first IP address to the first IP device.

9 Claims, 8 Drawing Sheets

F I G . 1
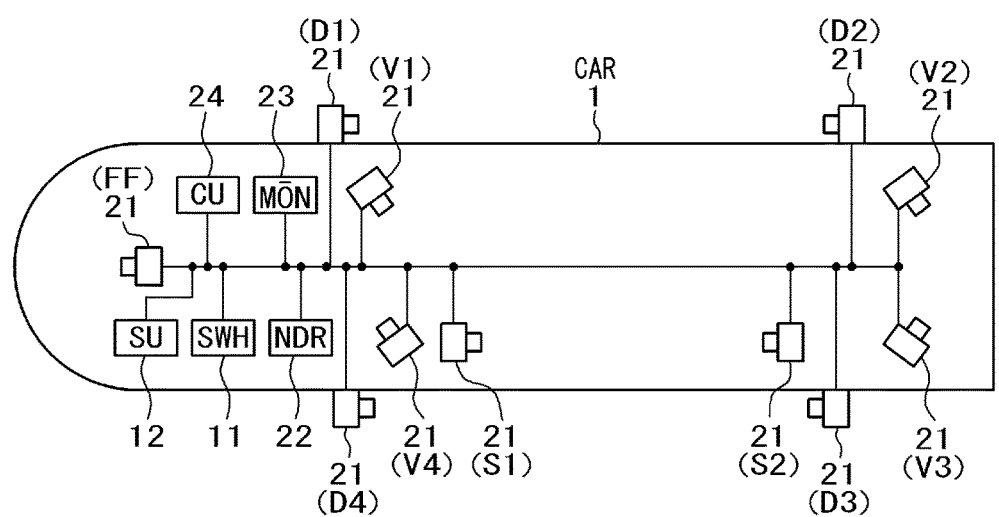

FIG.3

| PORT NUMBER | IP ADDRESS INFORMATION | DEVICE NAME | SETTING ORDER | FACTORY SHIPMENT IP ADDRESS | DEVICE INFORMATION FILE NUMBER |
|---|---|---|---|---|---|
| 1 | 1 | D1 | 2 | a | 11 |
| 2 | 2 | D2 | 3 | a | 12 |
| 3 | 3 | D3 | 4 | a | 13 |
| 4 | 4 | D4 | 5 | a | 14 |
| 5 | 5 | V1 | 6 | a | 15 |
| 6 | 6 | V2 | 7 | a | 16 |
| 7 | 7 | V3 | 8 | a | 17 |
| 8 | 8 | V4 | 9 | a | 18 |
| 9 | 9 | S1 | 10 | a | 19 |
| 10 | 10 | S2 | 11 | a | 20 |
| 11 | 18 | MON2 | 12 | b | 22 |
| 12 | – | SU | – | – | – |
| 13 | 13 | FF | 13 | a | 21 |
| 14 | 15 | NDR | 1 | c | 24 |
| 15 | 17 | MON1 | 14 | b | 23 |
| 16 | 21 | CU | 15 | d | 25 |
| – | 19 | SWH | 0 | e | 31 |

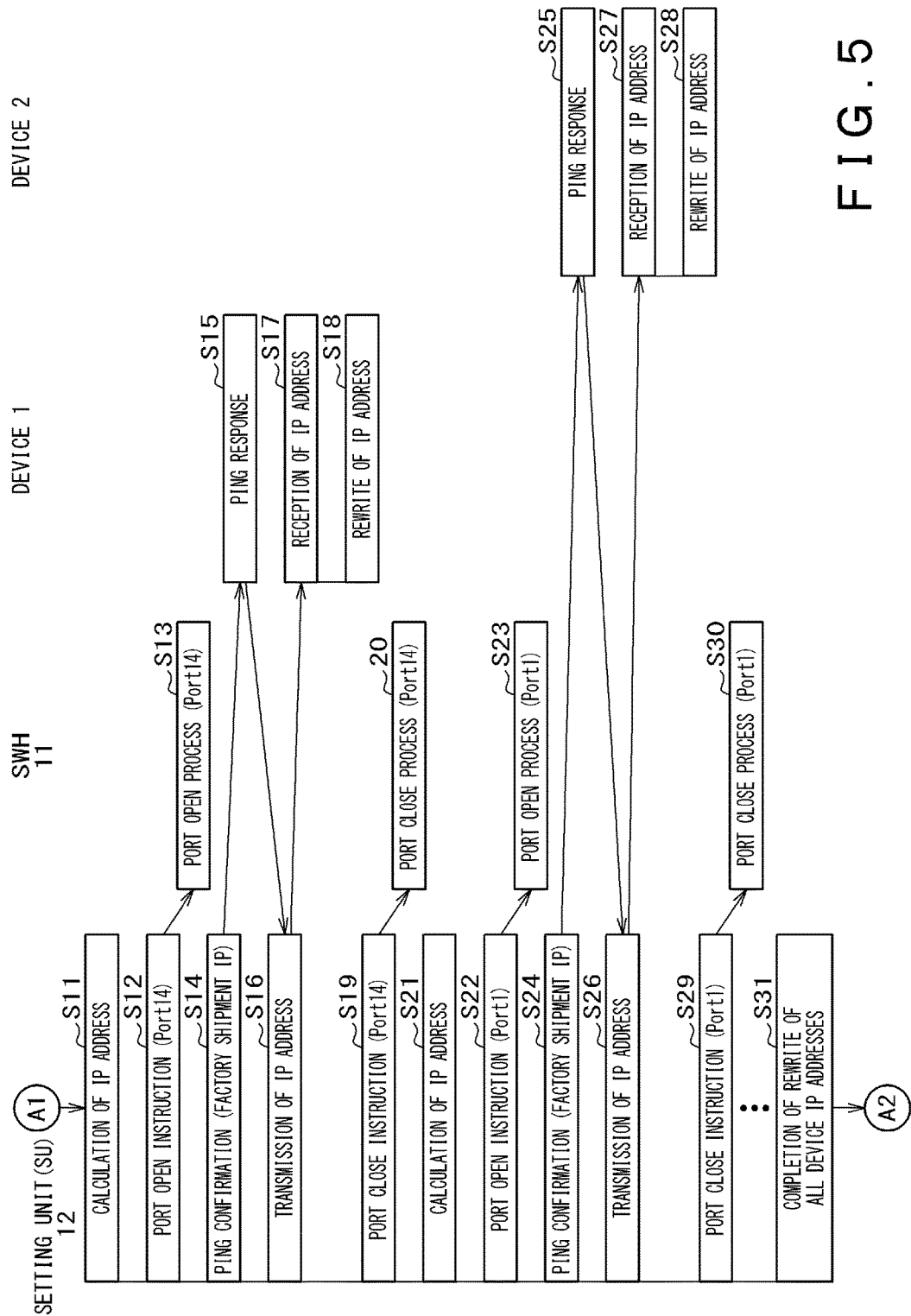
F I G. 5

FIG.7

| Time | Car ID | Device | IP Address | Status |
|---|---|---|---|---|
| 23/04/2014 16:09:13 | 811001 | D1 | 10.42.249.1 | transfer |
| | 811001 | D2 | 10.42.249.2 | ready |
| | 811001 | D3 | 10.42.249.3 | ready |
| | 811001 | D4 | 10.42.249.4 | ready |
| | 811001 | V1 | 10.42.249.5 | ready |
| | 811001 | V2 | 10.42.249.6 | ready |
| | 811001 | V3 | 10.42.249.7 | ready |
| | 811001 | V4 | 10.42.249.8 | ready |
| | 811001 | S1 | 10.42.249.9 | ready |
| | 811001 | S2 | 10.42.249.10 | ready |
| | 811001 | FF | 10.42.249.13 | ready |
| | 811001 | PT | 10.42.249.14 | ready |
| | 811001 | NDR1 | 10.42.249.15 | ready |
| | 811001 | NDR2 | 10.42.249.16 | ready |
| | 811001 | MON1 | 10.42.249.17 | ready |
| | 811001 | MON2 | 10.42.249.18 | ready |
| | 811001 | CU | 10.42.249.21 | ready |

FIG.8

| Time | Car ID | Device | IP Address | Status |
|---|---|---|---|---|
| 23/04/2014 16:09:58 | 811001 | D1 | 10.42.249.1 | Success |
| 23/04/2014 16:10:47 | 811001 | D2 | 10.42.249.2 | Success |
| 23/04/2014 16:11:36 | 811001 | D3 | 10.42.249.3 | Success |
| 23/04/2014 16:12:20 | 811001 | D4 | 10.42.249.4 | Success |
| 23/04/2014 16:13:36 | 811001 | V1 | 10.42.249.5 | Success |
| 23/04/2014 16:14:36 | 811001 | V2 | 10.42.249.6 | Success |
| 23/04/2014 16:16:56 | 811001 | V3 | 10.42.249.7 | Success |
| 23/04/2014 16:17:36 | 811001 | V4 | 10.42.249.8 | Success |
| 23/04/2014 16:18:36 | 811001 | S1 | 10.42.249.9 | Success |
| 23/04/2014 16:19:36 | 811001 | S2 | 10.42.249.10 | Success |
| 23/04/2014 16:21:36 | 811001 | FF | 10.42.249.13 | Success |
| 23/04/2014 16:21:36 | 811001 | PT | 10.42.249.14 | Success |
| 23/04/2014 16:21:36 | 811001 | NDR1 | 10.42.249.15 | Success |
| 23/04/2014 16:21:36 | 811001 | NDR2 | 10.42.249.16 | Success |
| 23/04/2014 16:21:36 | 811001 | MON1 | 10.42.249.17 | Success |
| 23/04/2014 16:21:36 | 811001 | MON2 | 10.42.249.18 | Success |
| 23/04/2014 16:21:36 | 811001 | CU | 10.42.249.21 | Success |

IP COMMUNICATION SYSTEM, IP ADDRESS SETTING UNIT, AND IP ADDRESS SETTING METHOD

TECHNICAL FIELD

The present invention relates to a technique for setting an IP (Internet Protocol) address to an IP device.

BACKGROUND ART

In a conventional technique, in the case where, for example, plural pieces of device data (data specifying operations of the devices) that are different from each other are set to plural IP devices (network cameras and the like) that are car facilities of trains, an operator first sets the IP address of each IP device one by one, and then sets the device data of each IP device using the set IP address.

The same initial IP addresses are set to IP devices (network cameras and the like) of the same kind that are mass-produced products when being shipped from a factory. Thus, in the case where plural IP devices of the same kind are used, communications cannot be performed using the IP addresses at the time of factory shipment. Therefore, it is necessary to first set the IP address of each IP device.

It should be noted that the IP address can be arbitrarily set on the basis of a MAC address (Media Access Control address) unique to the IP device. However, the MAC address is a 6-digit hexadecimal address. Therefore, in the case where the number of IP devices is large, a method of setting the IP address on the basis of the MAC address is not preferable because an operator likely to make a mistake.

Patent Literature 1 shown below describes an IP communication technique used in a train monitoring system including plural IP devices (network cameras and the like).

CITATION LIST

Patent Literature

PTL 1: Japanese Patent Application Laid-Open No. 2012-129908

SUMMARY OF INVENTION

Technical Problem

An object of the present invention is to provide a technique of setting respective IP addresses to plural IP devices.

Solution to Problem

The representative configuration of an IP communication system of the invention of the application to solve the above-described problem is as follows. Namely, provided is an IP communication system including a switching hub having, at least, first to (n+1)-th ports (n is an integer equal to or larger than 2), first to n-th IP devices respectively connected to the first to n-th ports, and an IP address setting unit connected to the (n+1)-th port, characterized in that: the IP address setting unit transmits to the switching hub a first port open instruction to close the second to n-th ports while opening the first port, and then transmits a first IP address to be set to the first IP device; and when receiving the first port open instruction from the IP address setting unit, the switching hub closes the second to n-th ports while opening the first port, and when receiving the first IP address, the switching hub transmits the first IP address to the first IP device.

Further, the representative configuration of an IP address setting unit of the invention of the application is as follows. Namely, provided is an IP address setting unit connected, through an (n+1)-th port, to a switching hub which has, at least, first to (n+1)-th ports (n is an integer equal to or larger than 2) and in which first to n-th IP devices are respectively connected to the first to n-th ports, the IP address setting unit transmitting to the switching hub a first port open instruction to close the second to n-th ports while opening the first port, and then transmitting a first IP address to be set to the first IP device.

Further, the representative configuration of an IP address setting method of the invention of the application is as follows. Namely, provided is an IP address setting method in an IP communication system including a switching hub having, at least, first to (n+1)-th ports (n is an integer equal to or larger than 2), first to n-th IP devices respectively connected to the first to n-th ports, and an IP address setting unit connected to the (n+1)-th port, the method including: a step of transmitting a first port open instruction to close the second to n-th ports while opening the first port from the IP address setting unit to the switching hub; a step of transmitting a first IP address to be set to the first IP device from the IP address setting unit to the switching hub; a step of closing the second to n-th ports while opening the first port when the switching hub receives the first port open instruction from the IP address setting unit; and a step of transmitting the first IP address to the first IP device when the switching hub receives the first IP address from the IP address setting unit.

Advantageous Effects of Invention

According to the above-described configurations, respective IP addresses can be easily set to plural IP devices.

BRIEF DESCRIPTION OF DRAWINGS

FIG. 1 is a layout drawing of IP devices of a train according to an embodiment of the present invention.

FIG. 3 is a port number/IP address correspondence table of a setting unit according to the embodiment of the present invention.

FIG. 5 is an IP address setting sequence diagram (No. 2) according to the embodiment of the present invention.

FIG. 7 shows a display example (during setting of IP addresses) of the setting unit according to the embodiment of the present invention.

FIG. 8 shows a display example (after setting the IP addresses) of the setting unit according to the embodiment of the present invention.

DESCRIPTION OF EMBODIMENTS

Figure 2:
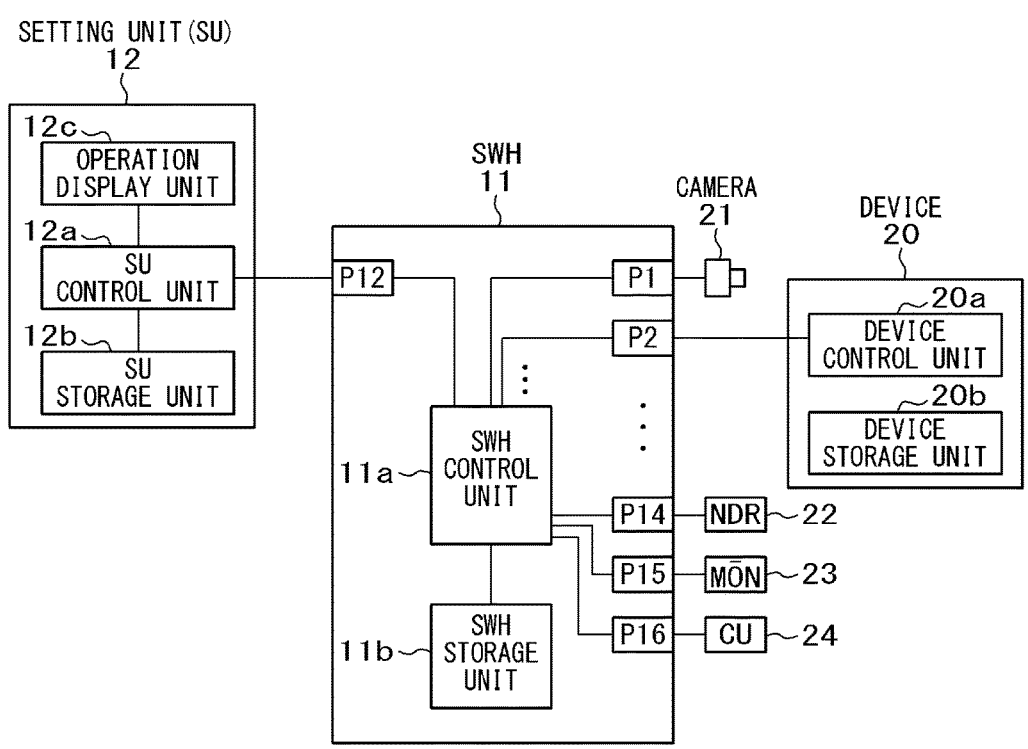
FIG. 2 is a configuration diagram of an IP communication system according to the embodiment of the present invention.

Hereinafter, an embodiment of the present invention will be described.

FIG. 1 is a layout drawing of IP devices of a train according to the embodiment of the present invention when viewing a car 1 from the upper side. The IP device is a device that has an IP address and can communicate with other IP devices using the IP address. As shown in FIG. 1, plural IP devices (cameras 21, an NDR 22, a monitor 23, and a control unit 24) are connected to a switching hub (SWH: relay apparatus) 11 in the car 1. The car 1 in the example of FIG. 1 is a leading car of the train. However, the switching hub 11 is installed even in a middle car of the train, and plural IP devices are connected to the switching hub 11.

The switching hub 11 is an IP device that relays communications among the IP devices connected to the switching hub 11. In detail, when receiving transmission data (the transmission data contains a destination IP address) from the IP device connected to the switching hub 11, the switching hub 11 transmits the transmission data to only the IP device having the destination IP address contained in the transmission data. An outline of the connection between the switching hub 11 and each IP device is shown in FIG. 1, and the details thereof will be described later.

Each camera (imaging apparatus) 21 images an imaging object, and generates image data to be transmitted to, for example, the network digital recorder (NDR) 22 recording the image data and the monitor 23 displaying the image data through the switching hub 11. In the example of FIG. 1, provided are eleven cameras 21 in total such as D1 to D4 provided outside the car 1 and V1 to V4, S1 to S2, and FF provided inside the car 1.

The network digital recorder (NDR) 22 records the image data received from each camera 21 through the switching hub 11. The monitor 23 displays the image data received from each camera 21 through the switching hub 11 in a viewable manner.

The control unit (CU) 24 controls each IP device through the switching hub 11. For example, the control unit (CU) 24 changes the direction of each camera 21, or instructs the network digital recorder 22 to set the recording timing of the image data from each camera 21. Alternatively, the control unit (CU) 24 instructs the monitor 23 to set the displaying timing of the image data from each camera 21.

As shown in FIG. 1, an IP address setting unit (SU) 12 for setting an IP address to each IP device is connected to the switching hub 11. Hereinafter, the IP address setting unit 12 will be simply referred to as a setting unit 12 in some cases. The setting unit 12 is connected to the switching hub 11 before starting the operation after mounting each IP device in the car 1. Further, the setting unit 12 sets an IP address to each IP device that is mounted in the car 1 and is connected to the switching hub 11.

As a detailed explanation, the IP address of each IP device in a state before starting the operation after mounting each IP device in the car 1 is an initial IP address at the time of factory shipment. Further, for example, the initial IP addresses of the eleven cameras 21 are the same. Therefore, it is necessary to rewrite the IP address of each IP device so as to be discriminable from each other. The setting unit 12 rewrites the IP address of each IP device using a preliminarily-set address conversion list (the correspondence table of FIG. 3 to be described later).

It should be noted that the setting unit 12 is removed after setting an IP address to each IP device in the embodiment. However, the setting unit 12 may be configured to be always connected to the switching hub 11. The setting unit 12 can be configured using, for example, a general personal computer.

FIG. 2 is a configuration diagram of an IP communication system according to the embodiment of the present invention.

In the example of FIG. 2, the setting unit 12 is connected to a port 12 (P12: a port with a port number 12) of the switching hub 11, and the respective IP devices are connected to ports other than the port 12. It is obvious that the setting unit 12 can be connected to any port other than the port 12. It should be noted that a port with a port number n is referred to as a port n.

The switching hub 11 includes an SWH control unit 11a, an SWH storage unit 11b, and ports 1 to 16 (P1 to P16). The SWH storage unit 11b and the ports 1 to 16 are connected to the SWH control unit 11a. Each port is a gate (communication port) through which the switching hub 11 communicates with the outside.

The SWH control unit 11a can set each of the ports 1 to 16 to a close state or an open state. The close state is a state in which the port cannot communicate with the outside. The open state is a state in which the port can communicate with the outside.

The SWH control unit 11a, for example, periodically inquires the IP device connected to each port about the IP address of each IP device in the open state of the port, and receives and obtains the IP address from each IP device. Further, the port number is associated with the IP address of the IP device connected to the port to be written and stored into the SWH storage unit 11b. It should be noted that the port number may be associated with not the IP address but identification data such as a MAC address with which an IP device can be specified.

The SWH storage unit 11b stores the IP addresses while being associated with the respective ports 1 to 16. In other words, the IP addresses of the IP devices connected to the respective ports 1 to 16 are stored. In the example of FIG. 2, for example, the IP address associated with the port 1 is that of the camera 21, and the IP address associated with the port 12 is that of the setting unit 12.

Thus, when the respective IP devices are mounted in the car 1 in a state before starting the operation and are connected to the ports 1 to 16 of the switching hub 11, the SWH control unit 11a receives and obtains the initial IP addresses (factory shipment IP addresses) of the IP devices connected to the ports 1 to 16, and associates the port number with the initial IP address of the IP device connected to the port to be written and stored into the SWH storage unit 11b.

In the example of FIG. 2, a configuration of an IP device 20 is shown as a representative of the IP devices such as the cameras 21, the NDR 22, the monitor 23, and the control unit 24. The IP device 20 includes an IP device control unit 20a and an IP device storage unit 20b. The IP device storage unit 20b is connected to the IP device control unit 20a. The IP address of the IP device 20 is stored in the IP device storage unit 20b. The factory shipment IP address that is an IP address at the time of factory shipment is stored in the IP device storage unit 20b at the time of factory shipment.

When receiving an IP address inquiry message from the switching hub 11, the IP device control unit 20a transmits to the switching hub 11 a response message containing the IP address of the IP device 20. The IP address inquiry message transmitted from the switching hub 11 contains transmission source IP address data (namely, the IP address of the switching hub 11) and a data type. The data type indicates that the message is the IP address inquiry message. The response message transmitted from the IP device 20 contains destination IP address data (namely, the IP address of the switching hub 11), transmission source IP address data (namely, the IP address of the IP device 20), and a data type. The data type indicates that the message is the IP address response message.

When receiving transmission data from any one of the other IP devices 20 through the switching hub 11, the IP device control unit 20a compares the destination IP address of the transmission data with the IP address of the IP device 20 stored in the IP device storage unit 20b. When the both IP addresses match each other, the transmission data is determined as data to be received by the IP device 20.

When receiving transmission data instructing to rewrite the IP address of the IP device 20 from the setting unit 12 through the switching hub 11, the IP device control unit 20a rewrites the IP address of the IP device 20 stored in the IP device storage unit 20b into an IP address for rewriting contained in the transmission data when the destination IP address of the transmission data matches the IP address of the IP device 20.

The setting unit (SU) 12 includes an SU control unit 12a, an SU storage unit 12b, and an operation display unit 12c. The SU storage unit 12b and the operation display unit 12c are connected to the SU control unit 12a. The operation display unit 12c is configured to include an operation unit that accepts an input indicating various instructions from an operator and a display unit that displays various dates. The operation unit is configured using, for example, a keyboard, a mouse, or the like. The display unit is configured using, for example, an LCD (Liquid Crystal Display) or the like. The operation display unit 12c may be configured using a touch panel obtained by integrating the display unit and the display unit.

The SU storage unit 12b associates the IP address (setting IP address) to be set to the IP device 20 connected to each port of the switching hub 11 with each port number of the switching hub 11 to be stored as a port number/IP address correspondence table (hereinafter, abbreviated as a correspondence table in some cases). The correspondence table is set and changed by an operator through, for example, the operation display unit 12c. The correspondence table may be configured to store, instead of the setting IP address, IP address data specifying the setting IP address. It should be noted that the IP address data may be the setting IP address itself.

FIG. 3 is the port number/IP address correspondence table of the setting unit according to the embodiment of the present invention.

In the correspondence table of FIG. 3, the IP address data specifying the IP address to be set to each IP device 20 is associated with each of the port numbers 1 to 16 of the respective ports of the switching hub 11. For example, IP address data "1" is associated with the port number 1, and IP address data "21" is associated with the port number 16.

In the example of FIG. 3, the IP address data specifying the setting IP address is used. The IP address data indicates a part (fourth octet) of the setting IP address. The first to third octets of the setting IP address are the same in the IP devices 20 mounted in the same car 1, namely, the IP devices 20 connected to the same switching hub 11.

For example, the IP address data "1" of FIG. 3 indicates the fourth octet of an IP address "10.42.249.1", and means the IP address "10.42.249.1". The first to third octets of the IP address specified by each IP address data of FIG. 3 are the same, and are represented by "10.42.249" in this case.

As described above, a part (first to third octets) of the setting IP address of each IP device 20 mounted in the same car 1 (namely, each IP device 20 connected to the same switching hub 11) is shared, so that a part (fourth octet) of the setting IP address can be used as the IP address data of the correspondence table. Thus, the IP address data can be easily registered to or changed in the correspondence table. Further, the first to third octets are determined on the basis of a car type (a type such as a leading car or a middle car) or a car number (where the middle car is located), so that the car where the IP device is installed can be discriminated using the first to third octets of the IP address. Further, the setting method of the IP address of the IPv4 has been described above in the embodiment. However, as similar to the IPv4, the IP address of the IPv6 can be set by separating a section determined on the basis of the car type and the car number from a section determined on the basis of the IP device.

It should be noted that the setting unit 12 is connected to a port with a port number 12, and thus it is not necessary to rewrite the IP address. Therefore, the IP address data specifying the setting IP address (the IP address after rewriting) is not necessary for the port number 12 in the correspondence table of FIG. 3. Further, IP address data "19" having no corresponding port number indicates the IP address of the switching hub 11. The IP address of the switching hub 11 has been already set by an operator using a method of a conventional technique.

In the correspondence table of the example of FIG. 3, the device name of each IP device 20, the setting order, the factory shipment IP address, and the device data file number are associated with each of the port numbers 1 to 16.

It should be noted that the port number, the setting IP address (IP address data), the device name, the setting order, the factory shipment IP address, and the device data file number are associated with each other by one port number/IP address correspondence table in the example of FIG. 3. However, these may be associated with each other using plural tables. For example, a table in which the port number is associated with the setting IP address, a table in which the setting IP address is associated with the device name, and a table in which the device name is associated with the device data file number may be separately provided.

The device names D1 to D4, V1 to V4, S1 to D2, and FF represent the cameras 21 of the same kind, and the factory shipment IP addresses thereof are the same as shown in FIG. 1. The device names that are different from each other are given depending on the places where the cameras 21 are installed, and the device data files including plural pieces of device data that are different from each other are set. The device data is data for specifying, for example, the direction or the imaging angle of the camera 21.

The device names MON1 to MON2 represent the monitors (display apparatuses), and the factory shipment IP addresses thereof are the same. The device names SU, NDR, CU, and SWH represent the setting unit 12, the network digital recorder 22, the control unit 24, and the switching hub 11, respectively.

The setting order represents the order of setting an IP address to each IP device 20 by the SU control unit 12a (namely, the address transmission order of transmitting the setting IP address from the setting unit 12 to the switching hub 11), and the order of setting each device data file (namely, the file transmission order of transmitting the device data file from the setting unit 12 to the switching hub 11).

It should be noted that in the case where the order of transmitting the IP address is set differently from the order of transmitting the device data file, for example, the setting order for the IP address and the setting order for the device data file may be provided in the table of FIG. 3. Alternatively, an address transmission order table in which the port numbers are associated with the transmission orders of the IP addresses and a file transmission order table in which the port numbers are associated with the transmission orders of the device data files may be provided in addition to the table of FIG. 3. Further, for example, in the case where the IP addresses and the device data files are transmitted according to the port numbers, the setting order in the table of FIG. 3 can be omitted.

In the example of FIG. 3, the setting IP address is first transmitted to the IP device (the network digital recorder 22 with the device name NDR) connected to the port with the setting order 1 and the port number 14 from the setting unit 12 through the switching hub 11. The setting IP address is calculated and generated by the setting unit 12 so as to include IP address data "15" as the fourth octet. For example, a setting IP address "10.42.249.15" is generated. Then, the factory shipment IP address "c" is rewritten into the setting IP address by the network digital recorder 22.

Next, the setting IP address is transmitted to the IP device (the camera 21 with the device name D1) connected to the port with the setting order 2 and the port number 1 from the setting unit 12 through the switching hub 11. The setting IP address is generated by the setting unit 12 so as to include IP address data "1" as the fourth octet. Then, the factory shipment IP address "a" is rewritten into the setting IP address by the camera 21 (D1).

Next, the setting IP address data is transmitted to the IP device (the camera 21 with the device name D2) connected to the port with the setting order 3 and the port number 2 from the setting unit 12 through the switching hub 11. The setting IP address is generated by the setting unit 12 so as to include IP address data "2" as the fourth octet. Then, the factory shipment IP address "a" is rewritten into the setting IP address by the camera 21 (D2).

As described above, the factory shipment IP addresses stored in the storage unit 20b of all the IP devices 20 to which IP addresses are set are written into the setting IP addresses in accordance with the setting order of the correspondence table of FIG. 3.

It should be noted that the correspondence tables created according to a car type and a car number are stored in the SU storage unit 12b. Further, the device data file to be set to each IP device 20 is stored in the SU storage unit 12b on the basis of the version of the device data file while being associated with the device data file number that is an identifier specifying the device data file.

When accepting an IP address setting instruction from an operator through the operation display unit 12c, the SU control unit 12a generates the setting IP address for each IP device 20 connected to the switching hub 11 on the basis of the correspondence table of FIG. 3 as described above. Then, the SU control unit 12a transmits the generated setting IP address to each IP device 20 through the switching hub 11. In this case, the SU control unit 12a transmits the setting IP address of each IP device 20 on the basis of the setting order of the correspondence table of FIG. 3 as described above.

Further, after transmitting the setting IP address, the SU control unit 12a transmits the device data file to each IP device 20 through the switching hub 11 using the IP address. In this case, the SU control unit 12a transmits the device data file on the basis of the device data file number and the setting order set in the correspondence table of FIG. 3. As a detailed description, the SU control unit 12a reads the device data file specified with the device data file number of the table of FIG. 3 from the SU storage unit 12b in accordance with the setting order of the table of FIG. 3, and transmits the same to the IP device 20 associated in the table of FIG. 3 through the switching hub 11.

As hardware configurations, each of the SWH control unit 11a, the SU control unit 12a, and the device control unit 20a includes a CPU (Central Processing Unit) and a memory into which an operation program for each control unit is stored, and each CPU is operated in accordance with each operation program.

Next, an IP address setting sequence according to the embodiment of the present invention will be described.

Figure 4:
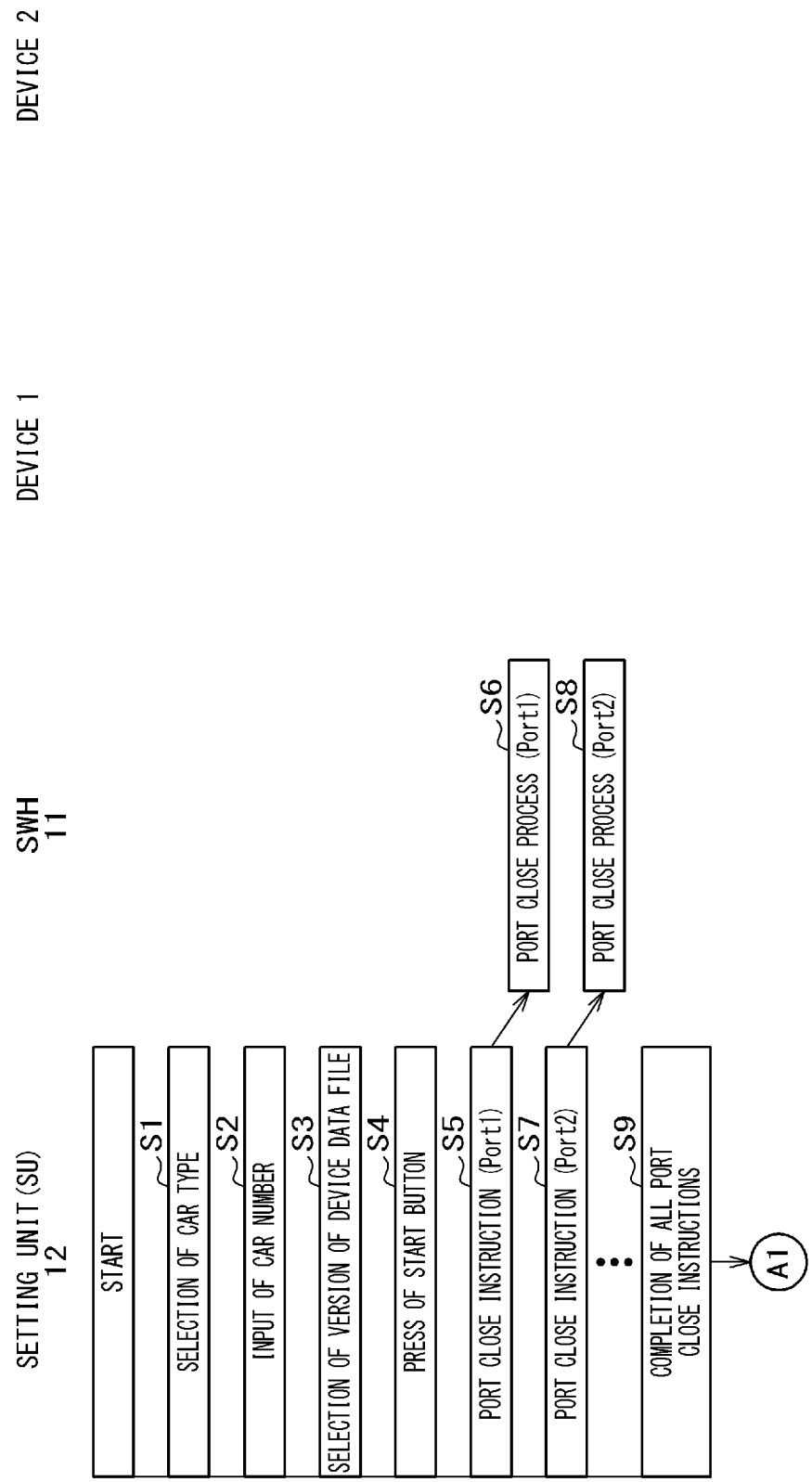
FIG. 4 is an IP address setting sequence diagram (No. 1) according to the embodiment of the present invention.
Figure 6:
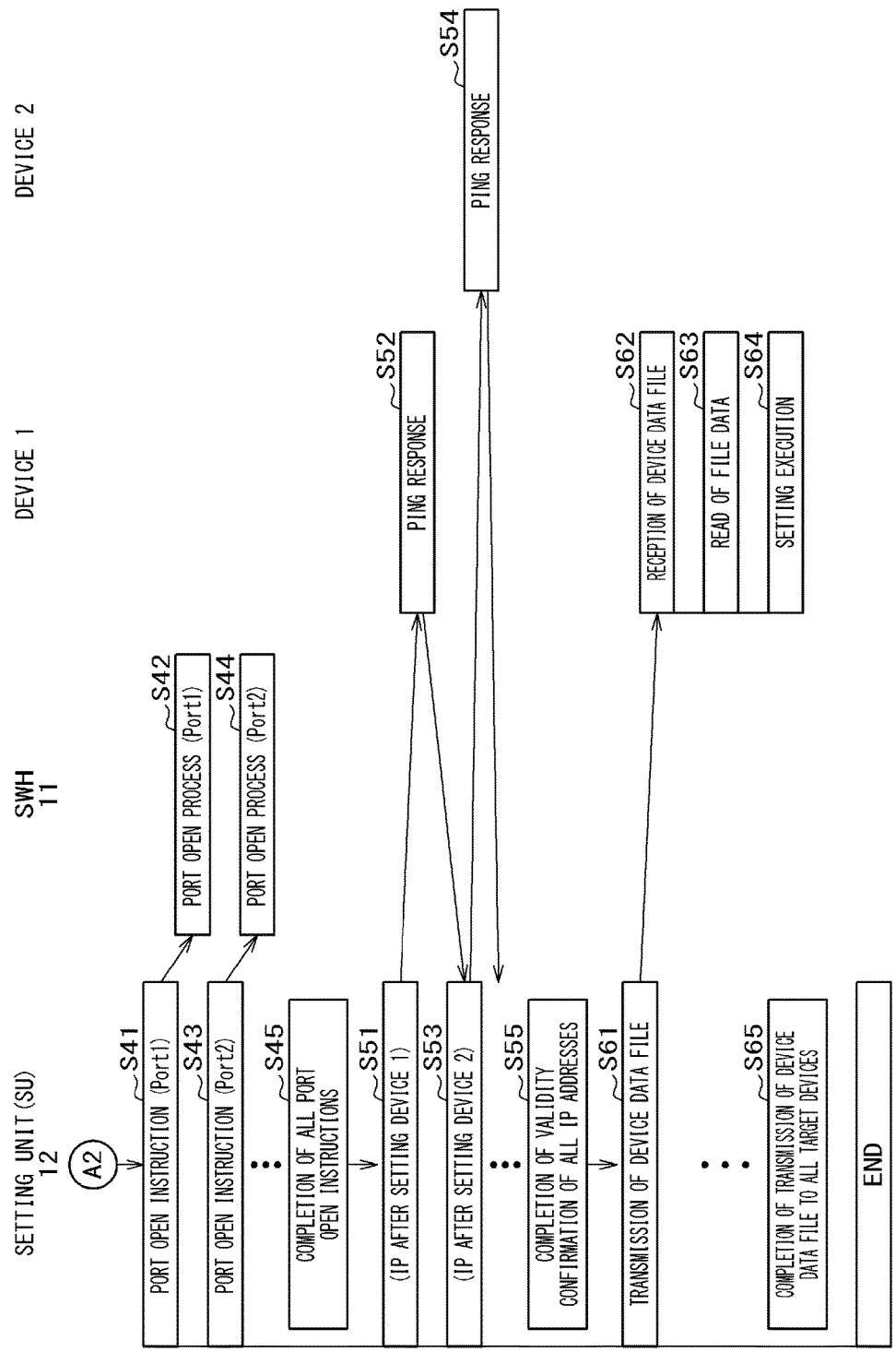
FIG. 6 is an IP address setting sequence diagram (No. 3) according to the embodiment of the present invention.

FIG. 4 to FIG. 6 are IP address setting sequence diagrams No. 1, No. 2, and No. 3, respectively, according to the embodiment of the present invention. In each of the IP address setting sequences, the operation of the setting unit 12 is controlled by the SU control unit 12a, the operation of the switching hub 11 is controlled by the SWH control unit 11a, and the operation of the IP device 20 is controlled by the device control unit 20a.

Before executing the IP address setting sequences of FIG. 4 to FIG. 6, the IP address of the switching hub 11 and the IP address of the setting unit 12 are set. The IP address of the setting unit 12 is set by an operator using the operation display unit 12c in accordance with a conventional technique. The IP address of the switching hub 11 may be set by the operator using an operation display unit (not shown) of the switching hub 11 in accordance with a conventional technique, or may be set using the setting unit 12 in a state where only the setting unit 12 is connected to the switching hub 11.

When the IP address is set, the switching hub 11 is restarted, and receives and obtains the IP address of the IP device 20 connected to each port. Then, the port number and the IP address of the IP device connected to the port are associated with each other to be stored in the SWH storage unit 11b.

Thereafter, as shown in FIG. 4, a car type is first selected on the operation display unit 12c by the operator (Step S1 of FIG. 4), a car number is input by the operator (Step S2), the version of a device data file is selected by the operator (Step S3), and then an IP address setting instruction, namely, a start button is pressed by the operator (Step S4).

When the start button is pressed, the setting unit 12 selects the correspondence table in accordance with the car type and the car number instructed by the operator. Then, the setting unit 12 transmits to the switching hub 11 an all-ports close instruction message to close all the ports of the switching hub 11 except the one to which the setting unit 12 is connected. For example, the setting unit 12 sequentially transmits, on a port basis, the port close instruction message related to all the ports (ports 1 to 11 and 13 to 16) of the switching hub 11 except the port 12 to which the setting unit 12 is connected.

When the ports are closed, the switching hub 11 cannot perform communications using the closed ports. In other words, the switching hub 11 cannot receive messages input to the closed ports from the outside, and cannot transmit messages from the closed ports to the outside.

In the example of the embodiment, a port close process is sequentially performed according to the port numbers for all the ports except the one to which the setting unit 12 is connected. In the case where there is a port to which the IP device 20 is not connected, the port is closed. The setting unit 12 first transmits to the switching hub 11 the port close instruction message for the port (port 1) with the port number 1 (Step S5). When receiving the port close instruction message for the port 1, the switching hub 11 performs the port close process for the port 1 (Step S6).

The port close instruction message transmitted from the setting unit 12 contains destination IP address data indicating a destination, transmission source IP address data indicating a transmission source, specified port number data specifying a port to be closed, and close instruction data instructing to close a port.

The destination IP address data is data specifying the IP device 20 that is the destination of the port close instruction message, and is specifically the IP address of the switching hub 11. The transmission source IP address data is data specifying the IP device 20 that is the transmission source of the port close instruction message, and is specifically the IP address of the setting unit 12.

Next, the setting unit 12 transmits the port close instruction for the port 2 to the switching hub 11 (Step S7). When receiving the port close instruction for the port 2, the switching hub 11 performs the port close process for the port 2 (Step S8). As described above, all the ports of the switching hub 11 except the one to which the setting unit 12 is connected are closed (Step S9).

After closing all the ports to be closed, the setting unit 12 sequentially sets an IP address to each IP device 20 in accordance with the setting order of the correspondence table of FIG. 3. In the embodiment, when the IP address is set, each IP device 20 is automatically restarted. It should be noted that each IP device 20 can be configured to be not restarted even after the IP address is set.

First, the setting unit 12 sets an IP address to the port 14 whose setting order is the first in the correspondence table of FIG. 3.

Specifically, the setting unit 12 first calculates and generates the setting IP address of the IP device 20 connected to the port 14 using the correspondence table of FIG. 3 (Step S11). In the example of FIG. 3, the IP device 20 connected to the port 14 is the network digital recorder 22, and the IP address data (fourth octet) of the correspondence table is "15". Thus, the setting IP address of the network digital recorder 22 is calculated as "10.42.249.15".

Next, the setting unit 12 transmits a port open instruction for the port 14 to the switching hub 11 (Step S12). The port open instruction message transmitted from the setting unit 12 contains destination IP address data (namely, the IP address of the switching hub 11), transmission source IP address data (namely, the IP address of the setting unit 12), specified port number data specifying a port to be opened, and an open instruction data to instruct to open a port.

The port open instruction to close the ports (ports 1 to 11, 13, 15, and 16) other than the port 12 and the port 14 while opening the port 14 is configured using the port close instructions for all the ports and the port open instruction for the port 14 as described above. Namely, the setting unit 12 transmits the port open instruction to close the ports other than the port 12 and the port 14 while opening the port 14 by transmitting the port close instructions for all the ports and the port open instruction for the port 14 as described above.

When receiving the port open instruction for the port 14, the switching hub 11 performs a port open process for the port 14 (Step S13). Accordingly, IP communications can be performed between the setting unit 12 and the network digital recorder 22 connected to the port 14 through the switching hub 11.

Next, the setting unit 12 transmits PING confirmation data (echo request) to the IP device 20 (network digital recorder 22) connected to the port 14 (Step S14). The PING confirmation data message transmitted from the setting unit 12 contains destination IP address data, transmission source IP address data, and a data type. The data type indicates that the message is the PING confirmation data.

The PING confirmation data is used to confirm whether or not communications can be performed with the IP device 20 specified with the destination IP address data, and is repeatedly transmitted for, for example, 10 seconds until PING response data to be described later is returned. In the case where the PING response data is not returned within a predetermined period of time, the operation display unit 12c displays the fact that there has been no response from the IP device 20 specified with the destination IP address data, and the sequence is transited to the IP address setting process for the port 1 of the next setting order (second).

The destination IP address data of the PING confirmation data message is data specifying the IP device 20 that is the destination of the PING confirmation data message, and is specifically the initial IP address (factory shipment IP address) of the network digital recorder 22. The factory shipment IP address is obtained from the correspondence table of FIG. 3. The transmission source IP address data is data specifying the IP device 20 that is the transmission source of the PING confirmation data message, and is specifically the IP address of the setting unit 12.

When receiving the PING confirmation data message from the setting unit 12, the switching hub 11 transmits the received PING confirmation data message to only the IP device 20 (network digital recorder 22) of the destination IP address of the PING confirmation data message. As a detailed description, the PING confirmation data message is transmitted to only the port 14 by referring to the correspondence table (namely, the correspondence table of the port number and the IP address of the IP device connected to the port) of the port number and the IP address stored in the SWH storage unit 11b.

When receiving the PING confirmation data from the setting unit 12 through the switching hub 11, the network digital recorder 22 transmits the PING response data (echo response) to the setting unit 12 through the switching hub 11 in the case where the received PING confirmation data is to the network digital recorder 22 itself, namely, in the case where the destination IP address of the received PING confirmation data is the IP address (factory shipment IP address) of the network digital recorder 22 (Step S15).

The PING response data message transmitted from the network digital recorder 22 contains destination IP address data, transmission source IP address data, and a data type. The data type indicates that the message is the PING response data.

The destination IP address data is data specifying the IP device 20 that is the destination of the PING response data message, and is specifically the IP address of the setting unit 12. The IP address of the setting unit 12 is obtained from the transmission source IP address data of the PING confirmation data message.

The transmission source IP address data is data specifying the IP device 20 that is the transmission source of the PING confirmation data message, and is specifically the factory shipment IP address of the network digital recorder 22. The factory shipment IP address is set in a storage unit of the network digital recorder 22 when shipping the network digital recorder 22 from the factory.

The setting unit 12 can confirm that a predetermined IP device 20 is correctly connected to a port with a predetermined number by appropriately receiving the PING response data. As a detailed description, the setting unit 12 determines whether or not the transmission source IP address data of the PING response data matches the factory shipment IP address of the port number 14 of the correspondence table in FIG. 3. When matching, it can be confirmed that a predetermined IP device 20 (network digital recorder 22) is appropriately connected to a port (port 14) with a predetermined number.

In the case where the PING response data cannot be appropriately received, the setting unit 12 displays on the operation display unit 12c the fact that the response from the IP device 20 specified with the destination IP address data of the PING confirmation data is not appropriate, and the sequence is transited to the IP address setting process for the port 1 of the next setting order (second).

After appropriately receiving the PING response data, the setting unit 12 transmits to the network digital recorder 22 an IP address to be set (Step S16). The IP address transmission message contains destination IP address data, transmission source IP address data, a data type, and data. The data type indicates that the message is IP address setting data. The data contains the IP address to be set.

The destination IP address data is data specifying the IP device 20 that is the destination of the IP address transmission message, and is specifically the factory shipment IP address of the network digital recorder 22. The factory shipment IP address is obtained from the correspondence table of FIG. 3 as described above. The transmission source IP address data is data specifying the IP device 20 that is the transmission source of the IP address transmission message, and is specifically the IP address of the setting unit 12.

When receiving the IP address transmission message from the setting unit 12, the switching hub 11 transmits the received IP address transmission message to only the IP device 20 (network digital recorder 22) of the destination IP address of the IP address transmission message.

When receiving the IP address transmission message from the setting unit 12 through the switching hub 11 (Step S17), the network digital recorder 22 rewrites the factory shipment IP address stored in the storage unit of the network digital recorder 22 into the setting IP address contained in the received IP address transmission message (Step S18). After rewriting the IP address, the network digital recorder 22 is automatically restarted.

After transmitting the IP address transmission message, the setting unit 12 transmits the port close instruction for the port 14 to the switching hub 11 (Step S19). The port close instruction message transmitted from the setting unit 12 contains, as described above, the destination IP address data (namely, the IP address of the switching hub 11), the transmission source IP address data (namely, the IP address of the setting unit 12), the specified port number data specifying a target port, and the close instruction data instructing to close a port.

When receiving the port close instruction for the port 14, the switching hub 11 performs the port close process for the port 14 (Step S20). Accordingly, IP communications cannot be performed between the setting unit 12 and the network digital recorder 22 connected to the port 14.

Next, the setting unit 12 sets an IP address to the port 1 whose setting order is the second in the correspondence table of FIG. 3.

Specifically, the setting unit 12 first calculates the setting IP address of the IP device 20 connected to the port 1 using the correspondence table (Step S21).

Next, the setting unit 12 transmits to the switching hub 11 the port open instruction for the port 1 (Step S22). The content of the port open instruction message is the same as described above.

When receiving the port open instruction for the port 1, the switching hub 11 performs the port open process for the port 1 (Step S23). Accordingly, IP communications can be performed between the setting unit 12 and the camera 21 (D1) connected to the port 1 through the switching hub 11.

Next, the setting unit 12 transmits the PING confirmation data (echo request) to the IP device 20 (camera 21 (D1)) connected to the port 1 through the switching hub 11 (Step S24). The content of the PING confirmation data message is the same as described above.

When receiving the PING confirmation data message from the setting unit 12, the switching hub 11 transmits the received PING confirmation data message to only the IP device 20 (camera 21 (D1)) of the destination IP address of the PING confirmation data message.

When receiving the PING confirmation data from the setting unit 12 through the switching hub 11, the camera 21 (D1) transmits the PING response data (echo response) to the setting unit 12 through the switching hub 11 (Step S25). The content of the PING response data message is the same as described above.

As described above, the setting unit 12 can confirm that a predetermined IP device 20 (camera 21 (D1)) is correctly connected to a port (port 1) with a predetermined number by receiving the appropriate PING response data.

After receiving the appropriate PING response data, the setting unit 12 transmits to the camera 21 (D1) the IP address transmission message containing the IP address to be set through the switching hub 11 (Step S26). The content of the IP address transmission message is the same as described above.

When receiving the IP address transmission message from the setting unit 12, the switching hub 11 transmits the received IP address transmission message to only the IP device 20 (camera 21 (D1)) of the destination IP address of the IP address transmission message.

When receiving the IP address transmission message from the setting unit 12 through the switching hub 11 (Step S27), the camera 21 (D1) rewrites the factory shipment IP address stored in the storage unit of the camera 21 (D1) into the setting IP address contained in the received IP address transmission message (Step S28). After rewriting the IP address, the camera 21 (D1) is automatically restarted.

A period of time (a restart period of time) required for the restart differs depending on the IP devices 20. The restart period of time is, for example, 20 to 30 minutes in the case of the network digital recorder 22, and is about one minute in the case of the camera 21.

In the embodiment, in the case where the restart period of time of a first IP device (for example, the NDR 22) is longer than that of a second IP device (for example, the camera 21), the transmission order is set so as to transmit a second IP address after transmitting a first IP address. Thus, after setting the IP address to the network digital recorder 22 whose setting order is the first in the embodiment, the IP addresses are set to the cameras 21 (D1 to D4, V1 to V4, and the like) whose setting orders are the second and later during the restart of the network digital recorder 22, and the cameras 21 can be restarted. Namely, the cameras 21 (D1 to D4, V1 to V4, and the like) can be restarted in parallel during the restart of the network digital recorder 22.

As described above, the IP addresses are sequentially set in accordance with the setting order of the correspondence table of FIG. 3 in the embodiment, and thus the setting order of the IP address of the IP device that is longer in the restart period of time can be set earlier than that of the IP address of the IP device that is shorter in the restart period of time. Accordingly, the entire restart period of time required for the IP devices can be shortened.

After transmitting the IP address data, the setting unit 12 transmits the port close instruction for the port 1 to the switching hub 11 (Step S29). The content of the port close instruction message is the same as described above.

When receiving the port close instruction for the port 1, the switching hub 11 performs the port close process for the port 1 (Step S30). Accordingly, IP communications cannot be performed between the setting unit 12 and the camera 21 (D1) connected to the port 1.

As described above, the IP addresses of all the IP devices 20 (note that the setting unit 12 is excluded) connected to the ports of the switching hub 11 are rewritten (Step S31).

After rewriting the IP addresses of all the IP devices 20 for which the IP addresses are to be set, the setting unit 12 opens all the ports (ports 1 to 16) to which the IP devices 20 are connected among those of the switching hub 11. In other words, the setting unit 12 transmits an all-ports open instruction to open all the ports (ports 1 to 11 and 13 to 16) of the switching hub 11 except the port 12 to which the setting unit is connected among all the ports (ports 1 to 16) to which the IP devices 20 are connected to the switching hub 11. As a detailed description, the setting unit 12 sequentially transmits, step by step, the port open instruction related to the ports 1 to 11 and 13 to 16 of the switching hub 11.

In the example of the embodiment, the port open process is sequentially performed for each port in the order of the port numbers.

The setting unit 12 first transmits the port open instruction for the port with the port number 1 (port 1) to the switching hub 11 (Step S41). When receiving the port open instruction for the port 1, the switching hub 11 performs the port open process for the port 1 (Step S42).

Next, the setting unit 12 transmits the port open instruction for the port 2 to the switching hub 11 (Step S43). When receiving the port open instruction for the port 2, the switching hub 11 performs the port open process for the port 2 (Step S44). As described above, all the ports (ports 1 to 11 and 13 to 16) of the switching hub 11 to which the IP devices 20 are connected are opened except the port 12 to which the setting unit 12 is connected (Step S45). In the case where there is a port to which the IP device 20 is not connected, the port is not opened.

After opening all the ports to be opened, the switching hub 11 receives and obtains the IP address after rewriting from the IP device 20. Then, the IP address of the IP device 20 stored in the SWH storage unit 11b is rewritten into the received IP address after rewriting. Namely, the correspondence between the port number stored in the SWH storage unit 11b and the IP address of the IP device 20 is updated.

Thereafter, the setting unit 12 confirms that a predetermined IP device 20 is correctly connected to a port with a predetermined number by sequentially transmitting the PING confirmation data to all the IP devices 20 connected to the ports of the switching hub 11 and by receiving appropriate PING response data. The destination IP address of the PING confirmation data is the IP address after rewriting.

In the example of the embodiment, the PING confirmation data is sequentially transmitted in accordance with the setting order of the correspondence table of FIG. 3.

First, the setting unit 12 transmits the PING confirmation data to the IP device 20 (network digital recorder 22) whose setting order is the first in the correspondence table through the switching hub 11 (Step S51). The destination IP address of the PING confirmation data is the IP address after rewriting. When receiving the PING confirmation data from the setting unit 12, the switching hub 11 transmits the received PING confirmation data message to only the IP device 20 (network digital recorder 22) of the destination IP address of the PING confirmation data message.

When receiving the PING confirmation data from the setting unit 12 through the switching hub 11, the network digital recorder 22 transmits the PING response data (echo response) to the setting unit 12 through the switching hub 11 in the case where the received PING confirmation data is to the network digital recorder 22 itself, namely, in the case where the destination IP address of the received PING confirmation data is the IP address (IP address after rewriting) of the network digital recorder 22 (Step S52).

When receiving the PING response data from the network digital recorder 22 through the switching hub 11, the setting unit 12 determines that the IP address of the network digital recorder 22 is correctly rewritten and set in the case where the transmission source IP address of the received PING response data is the IP address (IP address after rewriting) of the network digital recorder 22 specified in the correspondence table, namely, in the case where appropriate PING response data is received.

Next, the setting unit 12 transmits the PING confirmation data to the IP device 20 (camera 21 (D1)) whose setting order is the second in the correspondence table through the switching hub 11 (Step S53). The destination IP address of the PING confirmation data is the IP address after rewriting. When receiving the PING confirmation data from the setting unit 12, the switching hub 11 transmits the received PING confirmation data message to only the IP device 20 (camera 21 (D1)) of the destination IP address of the PING confirmation data message.

When receiving the PING confirmation data from the setting unit 12 through the switching hub 11, the camera 21 (D1) transmits the PING response data (echo response) to the setting unit 12 through the switching hub 11 in the case where the received PING confirmation data is to the camera 21 (D1) itself, namely, in the case where the destination IP address of the received PING confirmation data is the IP address (IP address after rewriting) of the camera 21 (D1) (Step S54).

When receiving the PING response data from the camera 21 (D1) through the switching hub 11, the setting unit 12 determines that the IP address of the camera 21 (D1) is correctly rewritten and set in the case where the transmission source IP address of the received PING response data is the IP address (IP address after rewriting) of the camera 21 (D1) specified in the correspondence table, namely, in the case where appropriate PING response data is received.

As described above, the setting unit 12 confirms that the IP address of each IP device 20 is correctly rewritten and set by sequentially transmitting the PING confirmation data in which the IP address after rewriting is the destination IP address to all the IP devices 20 connected to the ports of the switching hub 11 and by receiving the appropriate PING response data (Step S55).

After confirming that the IP address of each IP device 20 is correctly rewritten, the setting unit 12 sequentially transmits the device data files to the IP devices 20 connected to the ports of the switching hub 11 if necessary. In the example of the embodiment, the device data files are sequentially transmitted through the switching hub 11 in accordance with the setting order of the correspondence table. When the content of the received device data files is set, the IP devices 20 are automatically restarted.

For example, the setting unit 12 transmits the device data file, namely, the device data file transmission message containing the device data file to the IP device 20 (network digital recorder 22) whose setting order is the first in the correspondence table through the switching hub 11 (Step S61).

The device data file transmission message transmitted from the setting unit 12 contains destination IP address data, transmission source IP address data, and device data file data.

The destination IP address data is data specifying the IP device 20 that is the destination of the device data file transmission message, and is specifically the IP address of the network digital recorder 22 after rewriting. The transmission source IP address data is data specifying the IP device 20 that is the transmission source of the device data file transmission message, and is specifically the IP address of the setting unit 12.

When receiving the device data file transmission message from the setting unit 12, the switching hub 11 transmits the received device data file transmission message to only the IP device 20 (network digital recorder 22) of the destination IP address of the device data file transmission message.

When receiving the device data file transmission message from the setting unit 12 through the switching hub 11 (Step S62), the network digital recorder 22 reads the device data file contained in the received device data file transmission message to be stored into the storage unit of the network digital recorder 22 in the case where the received device data file transmission message is to the network digital recorder 22 itself, namely, in the case where the destination IP address of the received device data file transmission message is the IP address (IP address after rewriting) of the network digital recorder 22 (Step S63). Thereafter, the network digital recorder 22 is restarted (Step S64). Namely, the network digital recorder 22 executes the content of the read device data file.

Next, the setting unit 12 transmits the device data file to the IP device 20 (camera 21 (D1)) whose setting order is the second in the correspondence table through the switching hub 11. As described above, the device data files are transmitted to all the IP devices 20 to which the device data files are to be transmitted (Step S65). Then, each IP device 20 having received the device data file reads and executes the received device data file.

A setting period of time (a period of time required to set the device data file to the IP device 20) of the device data file is a period of time required for the IP device 20 to read and store the received device data file and then to execute the content of the device data file after restart, and is almost equal to a period of time (restart period of time) required to restart. The restart period of time differs depending on the IP devices 20. As described above, the restart period of time is, for example, 20 to 30 minutes in the case of the network digital recorder 22, and is about one minute in the case of the camera 21.

In the embodiment, in the case where the setting period of time of a first device data file set to a first IP device (for example, the NDR 22) is longer than that of a second device data file set to a second IP device (for example, the camera 21), the transmission order is set so as to transmit the second device data file after transmitting the first device data file. Therefore, the device data files can be set to the cameras 21 (D1 to D4, V1 to V4, and the like) whose setting orders are the second and later in parallel while setting the device data file to the network digital recorder 22 whose setting order is the first.

As described above, the device data files are sequentially transmitted in accordance with the setting order of the correspondence table after setting the IP address to each IP device 20 in the embodiment. Thus, the setting order of the device data file of the IP device that is longer in the setting period of time of the device data file can be set earlier than that of the device data file of the IP device that is shorter in the setting period of time of the device data file. Accordingly, the setting periods of time of the device data files of all the IP devices can be shortened.

As described above, in the IP communication system of the embodiment including the switching hub 11 having first to (n+1)-th ports (n is an integer equal to or larger than 2), the first to n-th IP devices respectively connected to the first to n-th ports, and the setting unit 12 connected to the (n+1)-th port, the setting unit 12 transmits an m-th (m is any one of 1 to n) port open instruction to close the first to n-th ports other than the m-th port while opening the m-th port of the first to n-th ports, and then transmits an m-th IP address to be set to the m-th IP device.

Further, when receiving the m-th port open instruction from the setting unit 12, the switching hub 11 closes the first to n-th ports other than the m-th port while opening the m-th port, and transmits the m-th IP address to the m-th IP device when receiving the m-th IP address.

Further, after transmitting to the switching hub 11 first to n-th IP addresses to be set to the first to n-th IP devices, the setting unit 12 transmits an all-ports open instruction message to open the first to n-th ports, and then transmits an m-th device data file to be set to the m-th IP device.

For example, in the case where n is 15 and m is 1, the setting unit 12 connected to a sixteenth port (port 12) transmits to the switching hub 11 a first port open instruction to close, for example, ports (ports 1 to 11, 13, 15, and 16) other than a first port (port 14) while opening the first port among the first to fifteenth ports (Steps S5 to S12), and then transmits a first IP address to be set to a first IP device (NDR 22) (Step S16).

Further, when receiving the first port open instruction from the setting unit 12, the switching hub 11 closes the ports (ports 1 to 11, 13, 15, and 16) other than the first port while opening the first port (port 14), and transmits the first IP address to the first IP device (NDR 22) when receiving the first IP address.

Further, after transmitting to the switching hub 11 first to fifteenth IP addresses to be set to first to fifteenth IP devices (Steps S11 to S31), the setting unit 12 transmits the all-ports open instruction to open the first to fifteenth ports (Steps S41 to S45), and then transmits a first device data file to be set to the first IP device (Step S61).

FIG. 7 shows a display example (during setting of the IP addresses) of the setting unit according to the embodiment of the present invention. As a detailed description, FIG. 7 shows an example in which an IP address setting status is displayed on the operation display unit 12c of the setting unit 12. FIG. 8 shows a display example (after setting the IP addresses) of the setting unit according to the embodiment of the present invention. As a detailed description, FIG. 8 shows an example in which a status after setting the IP addresses is displayed on the operation display unit 12c of the setting unit 12.

In FIG. 7 and FIG. 8, "Time" represents time during setting of the IP address or time after completion of setting the IP address. "Car ID" represents a car number. "Device" represents the device name of the IP device 20. "IP Address" represents an IP address to be set. "Status" represents a status in the IP address setting process.

For example, in the case of the IP device D1 (camera 21), FIG. 7 shows that the setting unit 12 is setting an IP address "10.42.249.1", namely, the IP address is being transmitted (transferred) from the setting unit 12 as of 16:09:13, Apr. 23, 2014. Further, in the case of the IP device D2 (camera 21), FIG. 7 shows that the setting unit 12 has completed setting preparation (ready) for an IP address "10.42.249.2". The completion of setting preparation is a status of being ready for transmission after the setting unit 12 generates the IP address.

Further, in the case of the IP device D1 (camera 21), FIG. 8 shows that the setting unit 12 has completed the setting of the IP address "10.42.249.1" at 16:09:58, Apr. 23, 2014, namely, the transmission from the setting unit 12 has completed (Success). Further, in the case of the IP device D2 (camera 21), FIG. 8 shows that the setting unit 12 has completed the setting (Success) of the IP address "10.42.249.2" at 16:10:47, Apr. 23, 2014.

As described above, the status of the IP address setting process is displayed on the operation display unit 12c of the setting unit 12. Thus, an operator who sets the IP addresses can easily recognize the progress of the IP address setting process or a result of whether or not the IP address setting has succeeded or failed. In the case where the IP address setting for a port fails, the IP address setting for the port is attempted again. In this case, only the progress or the result of the port for which the IP address setting has not been completed is preferably displayed.

It should be noted that the status of the IP address setting process is displayed in each of FIG. 7 and FIG. 8. However, the setting condition (namely, the condition in which the device data file is read and executed) of the device data file in each IP device may be displayed in the same manners as FIG. 7 and FIG. 8. In this case, the name and number of the device data file are preferably displayed while being associated with the device name of the IP device.

According to the embodiment, at least, the following effects can be exerted.

(a) The setting unit 12 transmits to the switching hub 11 the first port open instruction to close the second to n-th ports (except the one to which the setting unit 12 is connected) while opening the first port among the first to n-th ports to which the first to n-th IP devices 20 are respectively connected, and then transmits the first IP address to be set to the first IP device 20. Thus, the setting unit 12 can set or change the IP addresses of plural IP devices 20.

(b) After setting the IP addresses to all the IP devices 20 connected to the switching hub 11, the setting unit 12 transmits the device data file of each IP device 20 to the switching hub 11. Thus, at least, one of the entire setting period of time of the IP addresses or the entire setting period of time of the device data files can be shortened.

(c) The setting unit 12 transmits the device data files in accordance with the transmission order of the file transmission order table that defines the transmission order of each device data file. Thus, the entire setting period of time of the device data files can be shortened.

(d) In the case where a period of time required to set the first device data file to the first IP device is longer than that required to set the second device data file to the second IP device, the setting unit 12 transmits the second device data file after transmitting the first device data file. Thus, the entire setting period of time of the device data files can be shortened.

(e) The setting unit 12 transmits the IP addresses to the switching hub 11 in accordance with the transmission order of the address transmission order table that defines the transmission order of each IP address. Thus, the entire setting period of time of the IP addresses can be shortened.

(f) In the case where the setting unit 12 transmits to the switching hub 11 confirmation data for the IP device 20 after transmitting the port open instruction and appropriately receives response data to the confirmation data, the IP address is transmitted. Thus, the IP address can be reliably set to the appropriate IP device 20.

(g) In the case where the setting unit 12 stores the initial IP address of the IP device and the initial IP address matches the transmission source IP address contained in the response data, the IP address is transmitted. Thus, it can be easily confirmed whether or not the IP device 20 for which the IP address is to be set is appropriate.

(h) In the case where the setting unit 12 transmits to the switching hub 11 the confirmation data for the IP device 20 before transmitting the device data file and appropriately receives the response data to the confirmation data from the switching hub 11, the device data file is transmitted. Thus, the device data file can be reliably set to the appropriate IP device 20.

It should be noted that the present invention is not limited to the above-described embodiment. It is obvious that the present invention can be variously changed without departing from the scope thereof.

In the embodiment, after transmitting the IP address associated with each port, the setting unit 12 transmits the all-ports open instruction to open all the ports, and then transmits the device data file associated with each port. However, the device data file may be transmitted to each port after transmitting the IP address. Namely, the setting unit 12 may transmit the port open instruction to close the ports other than the first port while opening the first port, and may transmit the device data file associated with the first port after transmitting the IP address associated with the first port. Thereafter, the setting unit 12 may transmit the port open instruction to close the ports other than the second port while opening the second port, and may transmit the device data file associated with the second port after transmitting the IP address associated with the second port.

Further, the all-ports close process and the all-ports open process are sequentially performed according to the port numbers in the embodiment. However, the embodiment is not limited to the order of the port numbers, but an arbitrary order can be used. Further, the all-ports close process and the all-ports open process may be collectively performed at once without sequentially performing for each port depending on the configuration of the switching hub.

Further, the PING confirmation data and the device data file are transmitted from the setting unit 12 in a port open state after opening all the ports in the above-described embodiment. However, only a necessary port can be opened when the PING confirmation data and the device data file are transmitted from the setting unit 12.

Further, the setting unit 12 calculates the setting IP address, and transmits the calculated setting IP address to the IP device 20 through the switching hub 11 in the embodiment. However, the IP address data specifying the setting IP address can be transmitted from the setting unit 12, and the setting IP address can be calculated on the basis of the IP address data received by the switching hub 11 or the IP device 20.

Further, in the case where the initial IP address of the IP device 20 is the factory shipment IP address, the factory shipment IP address is rewritten into the setting IP address in the embodiment. However, the initial IP address to which the IP address is set is not limited to the factory shipment IP address. Further, in the case where no initial IP address is present (in the case where no IP address is set), the present invention can be applied.

REFERENCE SIGNS LIST

1: car
11: switching hub (SWH)
11a: SWH control unit
11b: SWH storage unit
12: IP address setting unit (SU)
12a: SU control unit
12b: SU storage unit
12c: operation display unit
20: IP device
20a: device control unit
20b: device storage unit
21: camera (imaging apparatus)
22: network digital recorder (NDR)
23: monitor (MON: display apparatus)
24: control unit (CU)

The invention claimed is:

1. An Internet Protocol (IP) communication system disposed in a train including a plurality of cars, comprising:
a switching hub having, at least, first to (n+1)-th ports (n is an integer equal to or larger than 2);
first to n-th IP devices installed in the train respectively connected to the first to n-th ports, each having a default IP address; and
an IP address setting unit connected to the (n+1)-th port, and including a controller coupled to a memory,
wherein the memory of the IP address setting unit stores a plurality of correspondence tables each corresponding to a car type and a car number, each correspondence table stores a correspondence between the first to n-th IP devices, the first to n-th ports that the IP devices are respectively connected to, and a plurality of first IP addresses that are different from the default IP addresses and respectively correspond to each of the first to n-th IP devices,
wherein the controller of the IP address setting unit is configured to:
receive an input indicating a car type and a car number from a user,
select a correspondence table, of the plurality of correspondence tables, that corresponds to the car type and car number,
transmit a first port open instruction to open the first port and to close the second to n-th ports to the switching hub, and then transmit a first IP address, that corresponds to the first IP device based on the selected correspondence table, to be set to the first IP device, and
wherein the switching hub, in response to receiving the first port open instruction from the IP address setting unit, closes the second to n-th ports and opens the first port, and in response to receiving the first IP address, transmits the first IP address to the first IP device.

2. The IP communication system according to claim 1, wherein:
after transmitting the first IP address, the IP address setting unit transmits a second port open instruction to close the first to n-th ports other than the second port and to open the second port to the switching hub, and then transmits a second IP address to be set to the second IP device, and
when receiving the second port open instruction from the IP address setting unit, the switching hub closes the first to n-th ports other than the second port and opens the second port, and when receiving the second IP address, the switching hub transmits the second IP address to the second IP device.

3. The IP communication system according to claim 2, wherein each correspondence table stores a transmission order of at least the first and second IP addresses, transmits the first IP address to the switching hub in accordance with the transmission order of the address transmission order table, and then transmits the second IP address.

4. The IP communication system according to claim 1, wherein the IP address setting unit stores the initial IP address of the first IP device, transmits first confirmation data for the first IP device to the first IP device through the switching hub after transmitting the first port open instruction, then receives first response data to the first confirmation data from the first IP device through the switching hub, and transmits the first IP address in the case where the initial IP address matches a transmission source IP address contained in the first response data.

5. The IP communication system according to claim 1, wherein the IP address setting unit stores the first port and first IP address data for specifying the first IP address while being associated with each other, generates the first IP address on the basis of the first IP address data, and transmits the generated first IP address.

6. The IP communication system according to claim 1, wherein:
after transmitting first to n-th IP addresses to be respectively set to the first to n-th IP devices, the IP address setting unit transmits to the switching hub an all-ports open instruction to open the first to n-th ports, then transmits a first device data file to be set to the first IP device, and then transmits a second device data file to be set to the second IP device, and
when receiving the all-ports open instruction from the IP address setting unit, the switching hub opens the first to n-th ports, then transmits the first device data file to the first IP device when receiving the first device data file, and transmits the second device data file to the second IP device when receiving the second device data file.

7. The IP communication system according to claim 6, wherein:
the IP address setting unit has a file transmission order table that defines the transmission order of the first and second device data files among those set to the first to n-th IP devices, and transmits the first and second device data files in accordance with the transmission order of the file transmission order table, and
the file transmission order table defines the transmission order so as to transmit the second device data file after transmitting the first device data file in the case where a period of time required to set the first device data file to the first IP device is longer than that required to set the second device data file to the second IP device.

8. An IP address setting unit connected, through an (n+1)-th port, to a switching hub which has, at least, first to (n+1)-th ports (n is an integer equal to or larger than 2) and in which first to n-th IP devices, disposed in a train, are respectively connected to the first to n-th ports, the IP address setting unit, comprising:
- a controller coupled to a memory,
- wherein the controller is configured to:
- wherein the memory of the IP address setting unit stores a plurality of correspondence tables each corresponding to a car type and a car number, each correspondence table stores a correspondence between the first to n-th IP devices, the first to n-th ports that the IP devices are respectively connected to, and a plurality of first IP addresses that are different from the default IP addresses and respectively correspond to each of the first to n-th IP devices,
- wherein the controller of the IP address setting unit is configured to:
- receive an input indicating a car type and a car number from a user,
- select a correspondence table, of the plurality of correspondence tables, that corresponds to the car type and car number, and
- transmit a first port open instruction to close the second to n-th ports and to open the first port to the switching hub, and then transmit a first IP address, that corresponds to the first IP device based on the correspondence table, to be set to the first IP device.

9. An IP address setting method in an IP communication system disposed in a train including a plurality of cars, comprising a switching hub having, at least, first to (n+1)-th ports (n is an integer equal to or larger than 2), first to n-th IP devices disposed in the train respectively connected to the first to n-th ports, each having a default IP address, and an IP address setting unit connected to the (n+1)-th port, the method comprising:
- a step of storing a plurality of correspondence tables, in the IP address setting unit, each corresponding to a car type and a car number, each correspondence table stores a correspondence between the first to n-th IP devices, the first to n-th ports that the IP devices are respectively connected to, and a plurality of first IP addresses that are different from the default IP addresses and respectively correspond to each of the first to n-th IP devices;
- a step of receiving an input indicating a car type and a car number from a user;
- a step of selecting a correspondence table, of the plurality of correspondence tables, that corresponds to the car type and car number;
- a step of transmitting a first port open instruction to close the second to n-th ports and to open the first port from the IP address setting unit to the switching hub;
- a step of transmitting a first IP address, that corresponds to the first IP device based on the selected correspondence table, to be set to the first IP device from the IP address setting unit to the switching hub;
- a step of closing the second to n-th ports while opening the first port in response to the switching hub receiving the first port open instruction from the IP address setting unit; and
- a step of transmitting the first IP address to the first IP device in response to the switching hub receiving the first IP address from the IP address setting unit.

* * * * *